US009536057B2

(12) United States Patent
Das et al.

(10) Patent No.: US 9,536,057 B2
(45) Date of Patent: Jan. 3, 2017

(54) PREMISES AWARE SECURITY

(71) Applicant: MCAFEE, INC., Santa Clara, CA (US)

(72) Inventors: Sudeep Das, Cupertino, CA (US); Pramod Sharma, Uttranchal (IN); Sumant Vashisth, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 14/126,707

(22) PCT Filed: Oct. 18, 2013

(86) PCT No.: PCT/US2013/065727
§ 371 (c)(1),
(2) Date: Dec. 16, 2013

(87) PCT Pub. No.: WO2014/063082
PCT Pub. Date: Apr. 24, 2014

(65) Prior Publication Data
US 2014/0351881 A1    Nov. 27, 2014

(30) Foreign Application Priority Data

Oct. 19, 2012 (IN) .......................... 1214/KOL/2012

(51) Int. Cl.
*H04L 29/00*     (2006.01)
*G06F 21/00*     (2013.01)
(Continued)

(52) U.S. Cl.
CPC .............. *G06F 21/00* (2013.01); *G06F 21/56* (2013.01); *G06F 21/629* (2013.01);
(Continued)

(58) Field of Classification Search
CPC .......... G06F 2221/2111; H04L 63/107; H04W 4/008
See application file for complete search history.

(56) References Cited

U.S. PATENT DOCUMENTS 5,922,073 A * 7/1999 Shimada ............. G06F 21/6218
726/6
5,987,610 A    11/1999 Franczek et al.
(Continued)

FOREIGN PATENT DOCUMENTS

| CN | 101523959 | 9/2009 |
|----|-----------|--------|
| JP | 2005-235050 | 9/2005 |

(Continued)

OTHER PUBLICATIONS

PCT International Search Report and Written Opinion received for PCT Patent Application No. PCT/US2013/065727, mailed on Jan. 28, 2014.
(Continued)

*Primary Examiner* — Dede Zecher
*Assistant Examiner* — Trang Doan
(74) *Attorney, Agent, or Firm* — Patent Capital Group

(57) ABSTRACT

Premise-based policies can be applied in the management of mobile devices and other computing devices within a system. A computing device is detected using close proximity wireless communication and location information is sent to the computing device using close proximity wireless communication. Policies applied to the computing device can be based at least in part on the location information.

18 Claims, 5 Drawing Sheets

(51) Int. Cl.
*G06F 21/56* (2013.01)
*G06F 21/62* (2013.01)
*H04L 29/06* (2006.01)
*H04W 12/08* (2009.01)
*H04W 4/02* (2009.01)
*H04W 4/00* (2009.01)

(52) U.S. Cl.
CPC .......... *H04L 63/107* (2013.01); *H04W 4/001* (2013.01); *H04W 4/02* (2013.01); *H04W 12/08* (2013.01); *G06F 2221/2111* (2013.01); *H04W 4/008* (2013.01)

(56) References Cited

U.S. PATENT DOCUMENTS

| | | | |
|---|---|---|---|
| 6,073,142 A | 6/2000 | Geiger et al. | |
| 6,460,050 B1 | 10/2002 | Pace et al. | |
| 6,571,279 B1* | 5/2003 | Herz | G06F 17/30867 707/999.01 |
| 7,506,155 B1 | 3/2009 | Stewart et al. | |
| 7,792,297 B1* | 9/2010 | Piccionelli | H04L 63/10 380/258 |
| 7,996,514 B2* | 8/2011 | Baumert | G06F 1/1632 709/203 |
| 8,166,532 B2* | 4/2012 | Chowdhury | G07C 9/00007 340/5.6 |
| 8,407,773 B1* | 3/2013 | Hayter | H04L 67/16 726/7 |
| 8,464,320 B2* | 6/2013 | Archer | G06F 21/40 709/224 |
| 8,803,660 B2* | 8/2014 | Martin | G08C 21/00 340/10.1 |
| 2004/0051664 A1 | 3/2004 | Frank | |
| 2005/0125674 A1* | 6/2005 | Nishiki | G07C 9/00031 713/182 |
| 2007/0083915 A1* | 4/2007 | Janakiraman | G06F 21/316 726/4 |
| 2007/0120736 A1* | 5/2007 | MacKenzie | G01S 13/825 342/357.66 |
| 2009/0077620 A1* | 3/2009 | Ravi | H04L 63/102 726/1 |
| 2010/0145784 A1* | 6/2010 | Sriver | G01C 21/20 705/14.25 |
| 2010/0169949 A1* | 7/2010 | Rothman | G06F 21/35 726/1 |
| 2011/0173260 A1* | 7/2011 | Biehl | G06Q 10/06 709/204 |
| 2011/0191862 A1 | 8/2011 | Mandava et al. | |
| 2011/0196868 A1* | 8/2011 | Hans | H04M 1/274583 707/737 |
| 2011/0321118 A1* | 12/2011 | Boldyrev | G06F 21/35 726/1 |
| 2012/0046045 A1* | 2/2012 | Gupta | G01S 5/0252 455/456.1 |
| 2012/0105202 A1* | 5/2012 | Gits | G01C 21/206 340/8.1 |
| 2012/0124637 A1* | 5/2012 | Dunaway | G06F 21/00 726/1 |
| 2012/0246074 A1* | 9/2012 | Annamalai | G01S 1/68 705/44 |
| 2012/0268241 A1* | 10/2012 | Hanna | G06F 21/32 340/5.52 |
| 2012/0303827 A1* | 11/2012 | Neystadt | H04L 63/107 709/229 |
| 2013/0081101 A1* | 3/2013 | Baer | G06F 21/577 726/1 |
| 2013/0091537 A1* | 4/2013 | Parla | G06F 21/00 726/1 |
| 2013/0212367 A1* | 8/2013 | Ingalls | G06F 21/6218 713/2 |
| 2013/0217410 A1* | 8/2013 | Ku | H04W 4/008 455/456.1 |
| 2013/0267174 A1* | 10/2013 | Moon et al. | 455/41.1 |
| 2014/0045536 A1* | 2/2014 | Sydir | H04W 4/021 455/456.5 |

FOREIGN PATENT DOCUMENTS

| | | |
|---|---|---|
| JP | 2006-251932 | 9/2006 |
| JP | 2007-233441 | 9/2007 |
| JP | 2010-072923 | 4/2010 |
| JP | 2010-097510 | 4/2010 |
| WO | WO 2004/057834 | 7/2004 |
| WO | WO 2006/017071 | 2/2006 |
| WO | WO 2012/058166 | 5/2012 |

OTHER PUBLICATIONS

PCT International Preliminary Report on Patentability in PCT International Applicaton Serial No. PCT/US2013/065727 mailed o Apr. 21, 2015.
Japanese Patent Office Action mailed Apr. 12, 2016 in Japanese Patent Application No. JP2015-537028.
Extended European Search Report and Search Opinion in European Patent Application 13847128.9 mailed May 20, 2016.
Japanese Patent Final Notice of Reasons for Rejection mailed Apr. 12, 2016 in Japanese Patent Application No. JP2015-537028 (2 pages).
Chinese Patent First Office Action mailed Sep. 2, 2016 in Chinese Patent Application No. 201380048495.9 (21 pages).

* cited by examiner

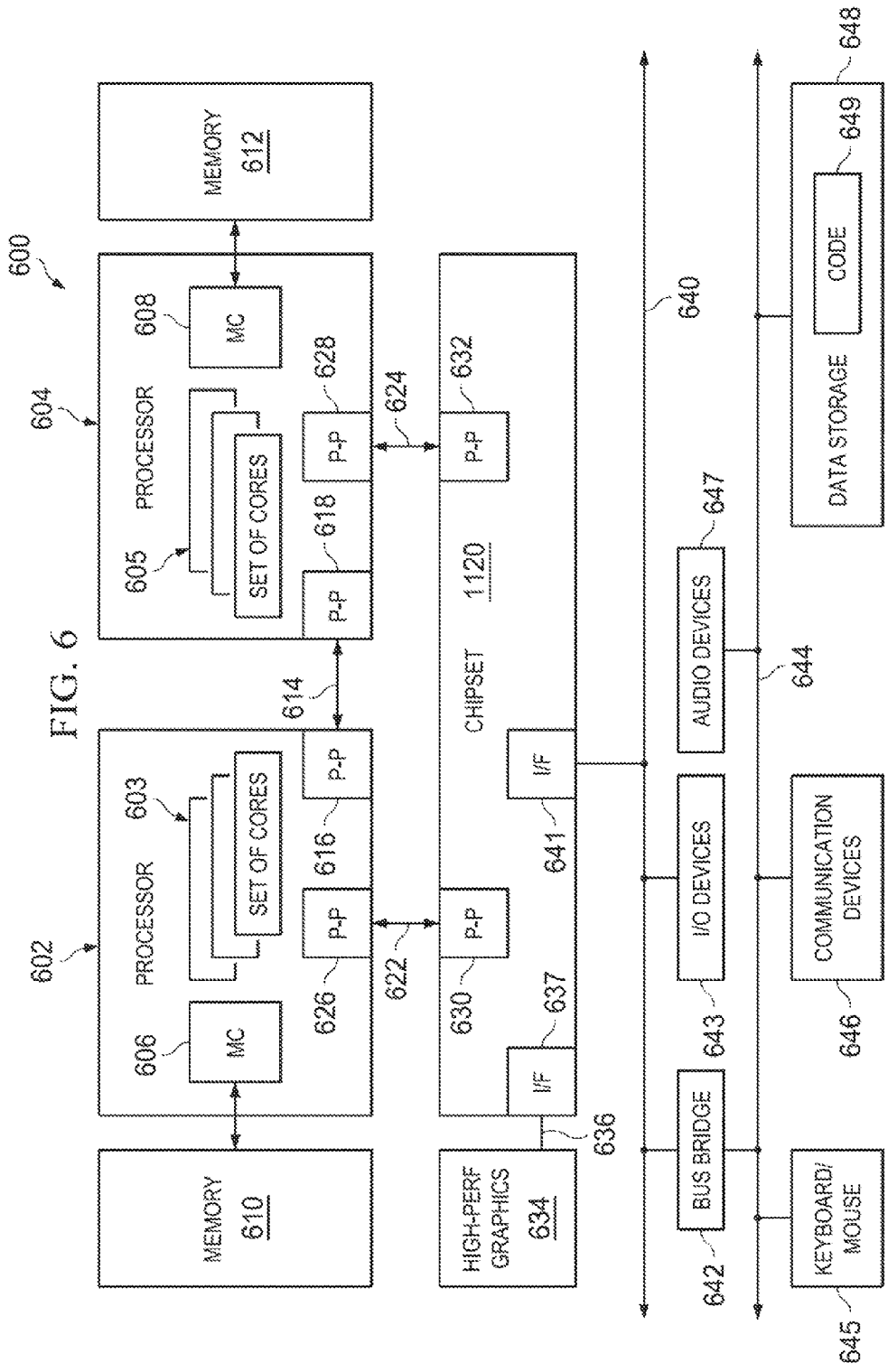

ial Application Serial No.
PREMISES AWARE SECURITY

CROSS-REFERENCE TO RELATED APPLICATIONS

This application is a national stage application under 35 U.S.C. §371 of PCT International Application Serial No. PCT/US2013/065727, filed on Oct. 18, 2013 and entitled PREMISES AWARE SECURITY, which application claims the benefit of priority to Indian Provisional Patent Application Serial No. 1214/KOL/2012 filed on Oct. 19, 2012 and entitled PREMISES AWARE SECURITY. The disclosures of the prior applications are considered part of and are hereby incorporated by reference in their entirety in the disclosure of this application.

TECHNICAL FIELD

This disclosure relates in general to the field of security and, more particularly, to managing applications in a mobile device based on location.

BACKGROUND

Bring your own device (BYOD) is a business policy of employees being allowed to bring personally owned computing devices, including mobile devices, to their place of work for use in lieu of or to supplement company-provided computing devices. Organizations allowing BYOD often allow these personal devices to be used to access enterprise networks and software systems, privileged company resources such as email, file servers and databases, in addition to the personal applications and data present on the personal device. Further, "consumerization of information technology" (CoIT) is the growing tendency for new information technology to emerge first in the consumer market and then spread into business and government organizations.

With rising incidence of BYOD and CoIT, enterprise security managers and administrators face an increasingly difficult task in ensuring compliance with legal, administrative, and organizational policies, including security policies. As examples, a doctor using their own tablet to access patient records, a travelling salesperson using their own device to store price lists and other company sensitive information, and employees using a cloud storage and retrieval service to access and share work-related items from outside the office can compromise other efforts to ensure compliance with relevant policies of an organization.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 6 illustrates a computing system that is arranged in a point-to-point (PtP) configuration according to an embodiment.

DETAILED DESCRIPTION OF EXAMPLE EMBODIMENTS

Figure 1:
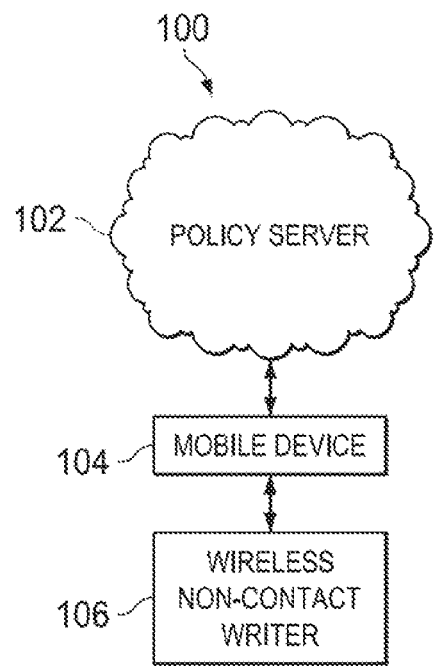
FIG. 1 is a simplified block diagram of a security environment in accordance with an embodiment.

FIG. 1 is a simplified block diagram of a security environment in accordance with at least one embodiment. For instance, in the example of FIG. 1, security environment 100 can include a policy server 102, a mobile device 104, and a wireless non-contact writer 106, among potentially other systems and components.

In general, an example policy server 102 may include a server implemented in hardware and/or software including, for instance, web servers, cloud-based servers, application servers. Policy server 102 may be communicatively coupled to one or more mobile devices 104, for instance, using one or more networks, and may be used to manage one or more mobile devices (e.g., 104) and administer and distribute policies of an organization.

Mobile devices (e.g., 104) may include, but are not limited to, a smartphone, tablet personal computer, laptop, personal gaming device, netbook, e-reader, or other type of computing device that is mobile. Mobile devices can include wireless radio frequency communication capabilities utilizing such technologies as radio frequency (RF), near field communication (NFC), WiFi, Bluetooth, or other short range wireless communication technologies. A mobile device can communicate with other systems over one or more networks using such wireless radio frequency communication capabilities and can further communicate its identity to these systems including, for example, access policy server 102 and other systems.

Wireless non-contact writer 106 may be, but not limited to, a near field communication (NFC) writer, a radio-frequency identification (RFID) writer, and/or other contactless communication devices. Radio-frequency identification can include the use of a wireless non-contact system that uses radio-frequency electromagnetic fields to transfer data from a tag attached to or embedded within an object for the purposes of automatic identification and tracking. Some tags may lack an independent power source (such as a battery) and can instead be powered by the very electromagnetic fields used to read them. Near field communication technologies can further include, in some examples, standards-based technologies, such as used in smartphones and similar devices, to establish radio communication between two or more device by touching the devices together or otherwise bringing them into close proximity (e.g., within a few centimeters).

Each of the elements and systems of FIG. 1 can couple to one another through simple interfaces or through any other suitable connection (wired or wireless), which provides a viable pathway for network communications. Additionally, any one or more of these elements may be combined or removed from the architecture based on the particular configuration of the environment. For instance, security environment 100 can include a configuration capable of transmission control protocol/internet protocol (TCP/IP) communications for the transmission or reception of packets in a network. Security environment 100 may also operate in conjunction with a user datagram protocol/IP (UDP/IP) or any other suitable protocol where appropriate or desired.

One or more embodiments of this disclosure recognize and take into account that administrators face increasing pressure to permit BYOD, but ensure compliance at the same time. In some instances, there may be a class of situations where the enterprise administrators would ordinarily restrict or allow access to computing resources depending on the physical location of the device being used by an authorized person. For example, a hospital may maintain policies (e.g., set by the hospital's chief information officer (CIO)) that conditionally allow doctors to use their personally owned tablet computers (or other devices) to access confidential patient record, but only when the device is physically present in the hospital. In another example, a company may dictate that a contract worker not be allowed to use social networking applications on his personal device when present in the office. In still another example, a policy can be defined that permits outside contractors to be allowed access to classified information only within the building, among potentially many other examples and policies. As illustrated by at least some of examples above, policies can be tailored that allow for policy enforcement based at least in part on the physical location of a device.

With rising incidence of BYOD, system administrators find it increasingly difficult to keep their systems secure while permitting users to use their devices. Administrators may desire the allowance of resource access to BYOD users subject to certain conditions and policies, such as physical location of the device, and whether the device is in a location that is trusted. In some implementations, these and other issues can be at least partially resolved through, for example, an integrated BYOD stack on monitored user-provided devices utilizing hardware and software elements that allow administrators to specify and enforce location-based policies, in some instances, in connection with security software and tools on the monitored devices.

Figure 2:
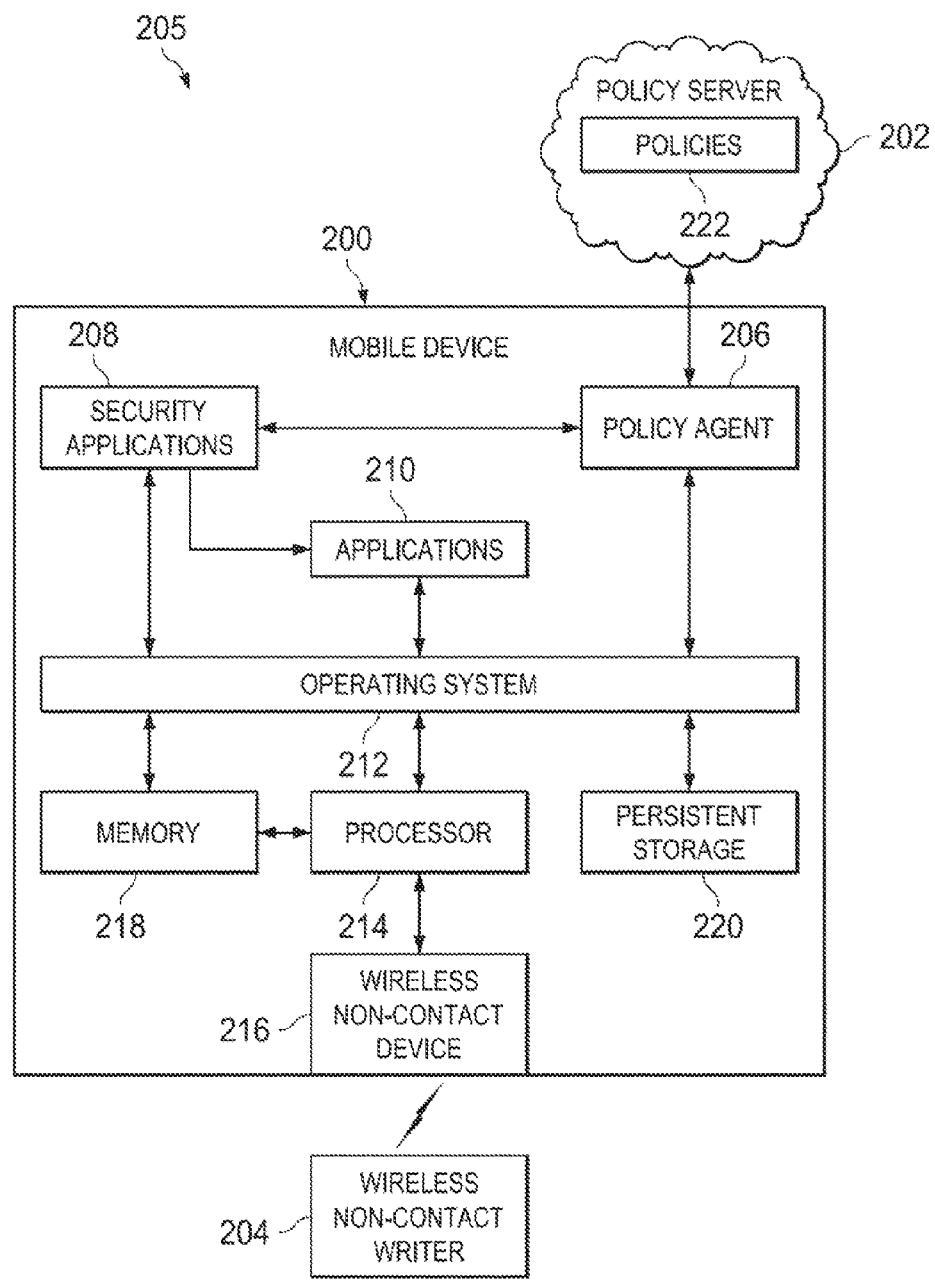
FIG. 2 is an example illustration of a security environment with a detailed view of a mobile device in accordance with an embodiment.

FIG. 2 is an example illustration of a security environment with a detailed view of a mobile device in accordance with at least one example embodiment. In one aspect, a mobile device 200 may be coupled through one or more wireless (or wireline) communication channels with a policy server 202 and a wireless non-contact writer 204 in a security environment 205. Mobile device 200 may include a policy agent 206, one or more security applications or tools 208, applications 210 (including software programs in user space or kernel space, etc.), an operating system 212, a processor 214, a wireless non-contact device 216, a memory element 218, and a persistent storage 220, among potentially other components implemented in hardware and/or software.

In one example, a policy agent 206 may be provided on mobile device 200 that is capable of communicating with a policy server 202. Policy server 202, in some implementations, may be a subsystem of a management system managing multiple devices within a particular environment or domain. Policy agent 206 may download policies 222 (e.g., from policy server 202) and make these available to security applications and tools 208 present on or otherwise available to the device 200. Indeed, in some instances, security applications 208 may query policy agent 206 for applicable policies 222 and enforce those policies returned in response to the query. For example, a policy may dictate, among a variety of examples, that a certain application of applications 210 is prohibited within a particular domain. The policy agent 206 can discover this policy (e.g., in response to a query of policy server) and cause one or more facilities (e.g., security applications 208) to prevent the application from running on the operating system 212, among other examples.

Security applications 208 can include security applications and tools that manage and enforce policies in connection with mobile device 200. Security applications can be deployed remote from the mobile device 200 or, in other cases, at least partially on the mobile device 200. For instance, security applications and tools 208 can include such examples as hardware firewalls, software firewalls, data loss prevention systems, web proxies, mail filters, hardware based controllers, kernel level controllers, host-based intrusion prevention systems, and malware detection software, among many other potential examples.

Applications 210 may include any processes that are executing on operating system 212 including applications in kernel and/or user space. For example, an application can include such examples as a voice over IP system, a file management system, an E-mail system, web browser, gaming application, instant messaging platform, office productivity application, among many other examples.

Wireless non-contact device 216 may be an RFID device, NFC device, non-volatile memory device with an antenna, or some other type of suitable communication device. Wireless non-contact device 216 may be connected to processor 214 through an inter-integrated circuit (i2c) two-wire interface, among other potential implementations, allowing wireless non-contact device 216 to communicate with the rest of the components in mobile device 200, among other examples.

In one example implementation, mobile device 200 may include software modules (e.g., a security agent, security applications, and/or a policy agent) to achieve, or to foster, operations as outlined herein. For example, a security agent may be a module capable of implementing the operations described in the embodiments of this disclosure. In other embodiments, such operations may be carried out by hardware, implemented external to these elements, or included in some other network device to achieve the intended functionality. Alternatively, these elements may include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Additionally, mobile device 200 and other systems and devices can include one or more processors (e.g., 214) capable of executing software, an algorithm, or other logic, such as logic stored in machine readable storage media, to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

With regard to the internal structure associated with security environment 205, mobile device 200 and other computing devices described herein can include memory elements for storing information to be used in the operations outlined herein. Memory elements can include, for example, elements in random access memory (RAM), read-only memory (ROM), erasable programmable ROM (EPROM), electrically erasable programmable ROM (EEPROM), application specific integrated circuit (ASIC), etc. and supporting software, hardware, or in any other suitable component, device, element, or object where appropriate and based on particular needs. The information being used, tracked, sent, or received, for instance, by mobile device 200, could be provided in any database, register, queue, table, cache, control list, or other memory element.

Memory (e.g., 218) and persistent storage (e.g., 220) are examples of storage devices. A storage device or other machine readable storage medium can include any piece of hardware that is capable of storing information, such as, for example, without limitation, data, program code in functional form, and/or other suitable information either on a temporary basis and/or a permanent basis. Memory (e.g., 218), in these examples, may be, for example, a random access memory or any other suitable volatile or non-volatile storage device. Persistent storage (e.g., 220) may take various forms, depending on the particular implementation. For example, persistent storage may contain one or more components or devices. For example, persistent storage may be a hard drive, a flash memory, a rewritable optical disk, a rewritable magnetic tape, or some combination of the above. The media used by persistent storage also may be removable. For example, a removable hard drive may be used for persistent storage. Additionally, persistent storage may also carry policies, such as policies 222. These policies may be also read and utilized, for example, by policy agent 206 and security applications 208, among other examples.

In certain example implementations, the functions outlined herein may be implemented by logic encoded in one or more computer readable storage media (e.g., embedded logic provided in an ASIC, digital signal processor (DSP) instructions, software (potentially inclusive of object code and source code) to be executed by a processor, or other similar machine, etc.). In some of these instances, memory elements can store data used for the operations described herein. This includes the memory elements being able to store software, logic, code, or processor instructions that are executed to carry out the activities described herein.

Figure 3:
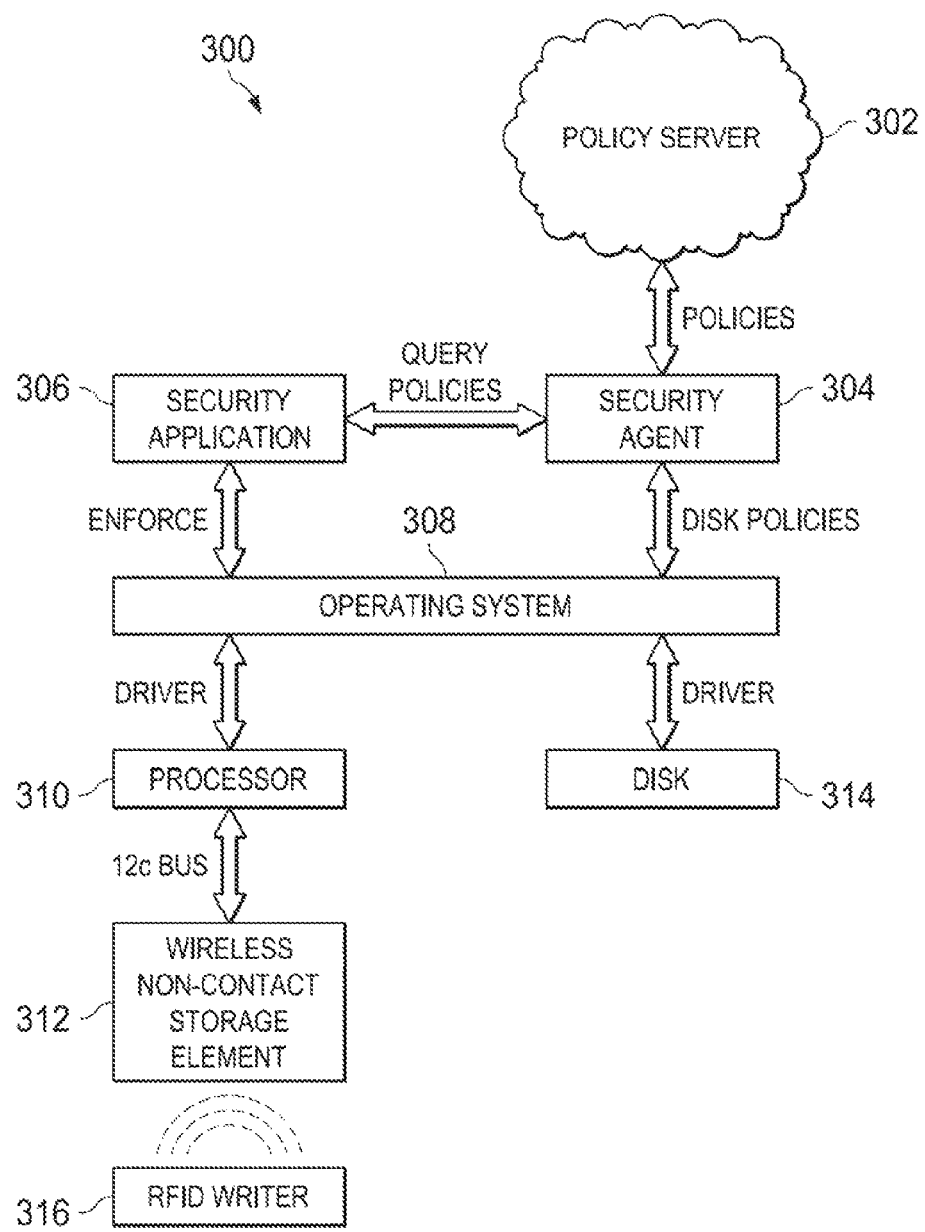
FIG. 3 is an example illustration of a security system in accordance with an embodiment.

FIG. 3 is an example illustration of a security system in accordance with one example embodiment. Security system 300 can be present on a mobile device and implement policies on the mobile device based on location and/or the identity of a user of the mobile device. Security environment may include a policy server 302, security agent or manager 304 capable of interfacing with the policy server 302, one or more security applications 306, an operating system 308, a processor 310, system memory (e.g., 314), secured nonvolatile memory, a radio frequency communication module, among other components and functionality. In one example implementation, a module, such as a wireless non-contact storage element 312, can be provided that includes non-volatile memory and a provisioning capability via radio frequency, I2C, or other wireless transmission technology, allowing for data to be written to the wireless non-contact storage element, such as tokens, certificates, RFIDs, secure code onboard, etc.

One or more embodiments of this disclosure provide an integrated mechanism of resolving at least some of the example issues identified and discussed above, among others. In some implementations, a wireless non-contact storage element 312 may include an Ultra High Frequency (UHF) RFID tag, along with memory and an i2c data bus. This allows for contactless storage of data via RFID for the mobile device. Security agent 304 can include an agent on the mobile device that is configured to communicate to policy server 302, download policies and make them available to other security applications, tools, and solutions on or otherwise accessible to the device. Such policies can be based, for instance, on identification of a location through the contactless communication functionality provided, for instance, through a wireless non-contact storage element 312. Security applications 306 may query security agent 304 for applicable policies and enforce them, based, for instance, on the device's location. For example, a policy may say that applications or services are prohibited, such as a video conferencing, VOIP, or other application and supporting subsystems (e.g., a camera, telephone module, etc.). Security applications can query this policy and prevent the offending application from running on the system or accessing certain device subsystems based on the detection of the mobile device residing within a particular location.

A user can acquire a mobile device that includes a security agent (e.g., 304), available security tools (e.g., 306), as well as functionality (e.g., wireless non-contact storage element 312) for communicating wirelessly with other devices in close proximity the mobile device and storing data corresponding to the information received in these close proximity communications. In one illustrative example, a user can bring such a personal device into another environment, such as the user's workplace. At an initial visit, corresponding to the first time the user brings the personal mobile device into the environment, the user can identify and register the device for the environment.

In one example implementation, the user can take the device to a kiosk, checkpoint, administrator, or other entity of the environment which can read an RFID tag or other identifier of the mobile device using the wireless communication capabilities of the mobile device. For instance, a persistent RFID of the device stored in wireless non-contact storage element 312 can be read to acquire device identification information for the user's personal mobile device. Further, in some implementations, the kiosk, registration device, or other entity can additionally read an access badge, driver's license, credit card, ID card, or other identification of the user, and associate, or bind, the identified personal mobile device (e.g., by a device identifier obtained from the persistent RFID of the device) with the user identity. In either instance, the user can then allow the kiosk, for example, through an RFID writer or other module provided in connection with the wireless communication module of the personal mobile device, to flash management server details or other credentials along with a location identifier to the mobile device (e.g., on wireless non-contact storage element 312) using NFC, RFID, or other close proximity communications technology.

Through security system implementations employing principles of the above example, BYOD issues can be alleviated by detecting a presence of a device in a gated premises or other premises. Entry and exit gates of a premises, for instance, or rooms inside a building can be equipped with RFID readers and/or RFID writer 316, among other near field wireless identifier readers. When a device enters a premises, a location ID may be flashed to the entering mobile device using a close proximity wireless communication transmission (e.g., using RFID, NFC, Bluetooth, etc.). The location ID can be maintained on the mobile device (e.g., on wireless non-contact storage element 312) throughout the duration of the mobile device's presence within the premises. The location ID can further inform security tools monitoring networks and other resources associated with the location of the relevance of particular policies applicable to the mobile device while the mobile device resides within the premises. Further, when the device exits the location (e.g., through an exit employing another or the same RFID writer) additional data can be communicated to the mobile device causing the location ID to be wiped off of the mobile device indicating that the mobile device has exited the premises. In summary, in some implementations, the presence of a specific location ID on wireless non-contact storage element 312 can establish the presence of the mobile device on a premises (as monitored by systems protecting and managing the premises) as well as indicate to the mobile device its presence within a particular premises.

In some implementations, a software agent, such as security agent 304, on the mobile device can query other components and subsystems on the mobile device, such as wireless non-contact storage element 312, for identification of a policy server corresponding to a particular premises, such as policy server 302. The mobile device can send its information and the received location identifier and query the policy server 302 for policies that are applicable to the mobile device based at least in part on the mobile device's presence within a particular premises (evidenced by the mobile device's possession of the location identifier data). Additional mobile device attributes can also be considered, including the make, model, and type of the device, capabilities of the device, identity of the user of the device, the time of day, among other attributes and examples. The policy server 302 can further check the device ID (acquired for the mobile device during initial provisioning of the mobile device at the premises) and use the device ID to discover attributes known for the mobile device. A policy server 302 can then pass appropriate policies to the device, including premises-specific policies, based further on the particular attributes discovered for the mobile device.

Security policies discovered for a particular mobile device, based on its location within a particular premises, can be communicated to the device, for instance, using security agent 304. Security agent 304 can further provide the security policies to other security applications and tools available to the mobile device. For instance, while a particular mobile computing device may include or otherwise make use of applications and services such as social networking applications, VOIP, video conferencing, gaming, cloud data uploads, etc. one or more of these applications and services may be automatically disabled by security applications and tools present on or remote from the mobile device based on detecting that the mobile device has entered a particular premises or physical environment and is subject to one or more corresponding policies dictating the disabling of the particular programs and services. Further, various functionality of a mobile device, such as video and photo cameras, audio recorders, WiFi, data storage, network access, or other functionality that potentially allows the capture and storage of sensitive information, etc. may be at least partially disabled on the mobile device (e.g., using security applications and tools) based on detecting that the mobile device has entered a particular premises or physical environment and is subject to one or more corresponding policies dictating the disabling of the respective device functionality.

In some instances, other geolocation data, such as global positioning data collected using a global positioning system (GPS) sensor on the mobile device, can be used to supplement or corroborate information collected by the mobile device (e.g., by wireless non-contact storage element 312) relating to confirming a mobile device's presence within a particular premises. For instance, in one example, GPS data can be collected at a mobile device to corroborate premises ID data written to the mobile device through close proximity wireless communications with a device at the premises indicating that the mobile device has entered the premises. This can guard against spoofing of a premises, for instance, by correlating a known geolocation of a premises against geopositional data collected by the mobile device to confirm that the mobile device is indeed within the premises and not falsely applying policies that are specific to the mobile device's presence within the premises. Traditional geolocational technology may, in some contexts, be insufficient by themselves to confirm a device's location within a given premises. For instance, location obtained via network information (IP address, subnet masks, etc.) and GPS sensors may, in some contexts, have limited accuracy and result in the false application of premises-specific policies. For instance, traditional GPS sensors do not provide altitude information and, as a result, in instances where an office or premises is on a particular floor of a multi-story building, the GPS sensors may be poorly equipped to distinguish from one premises on a first floor of the building and a second, distinct premises on the sixth floor, together with corresponding policies applicable to one or both of these distinct premises. However, utilizing a wireless "sign-in" of a device through the exchange of premises and device credentials through close proximity communications can resolve at least some of the shortcomings of more traditional technologies. Further, combining such close proximity wireless sign-ins with information obtained through other technologies, such as GPS geolocation, can further enhance the accuracy and seamlessness of confirming a mobile device's presence within a premises and accurately applying premises-specific policies to the device while it is resident within the premises.

Figure 4:
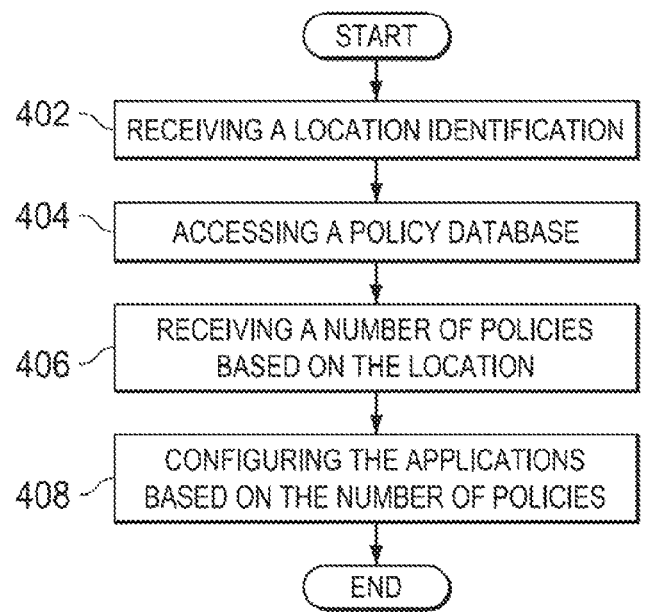
FIG. 4 is a simplified flowchart illustrating a process for managing a number of applications on a mobile device in accordance with an embodiment.

FIG. 4 is a simplified flowchart illustrating an example process for managing a number of applications on a mobile device in accordance with an embodiment. A flow 400 may be a process that operates during an encryption protocol session. At 402, a wireless non-contact storage device receives location identifier data. The location identifier may be received from a wireless non-contact writer. The wireless non-contact device may be a non-volatile memory with an antenna. The location identifier may relate to a physical location, or premises. When receiving the location identifier, the wireless non-contact device may be adding the location identifier or removing the location identifier from the wireless non-contact device. This may correlate with entering or exiting a location or premises as described above in FIG. 3.

At 404, a policy agent may access a policy database. At 406, the policy agent may receive a number of policies to be applied at the mobile device based on the mobile device being detected as residing within the location. At 408, one or more security applications or tools may configure the applications based on the number of policies to be applied at the mobile device. Additionally, in some instances, the mobile device may be associated with a user. A wireless non-contact writer or reader may do the associating by reading information from the wireless non-contact device and binding device identifier information with a user identification component obtained from a user identification badge or some other user-specific identifier. Additionally, when the mobile device is associated with a user, the number of policies may be further based both on the location and the user, as well as features of the device to which the policies are to be applied, among other examples.

Figure 5:
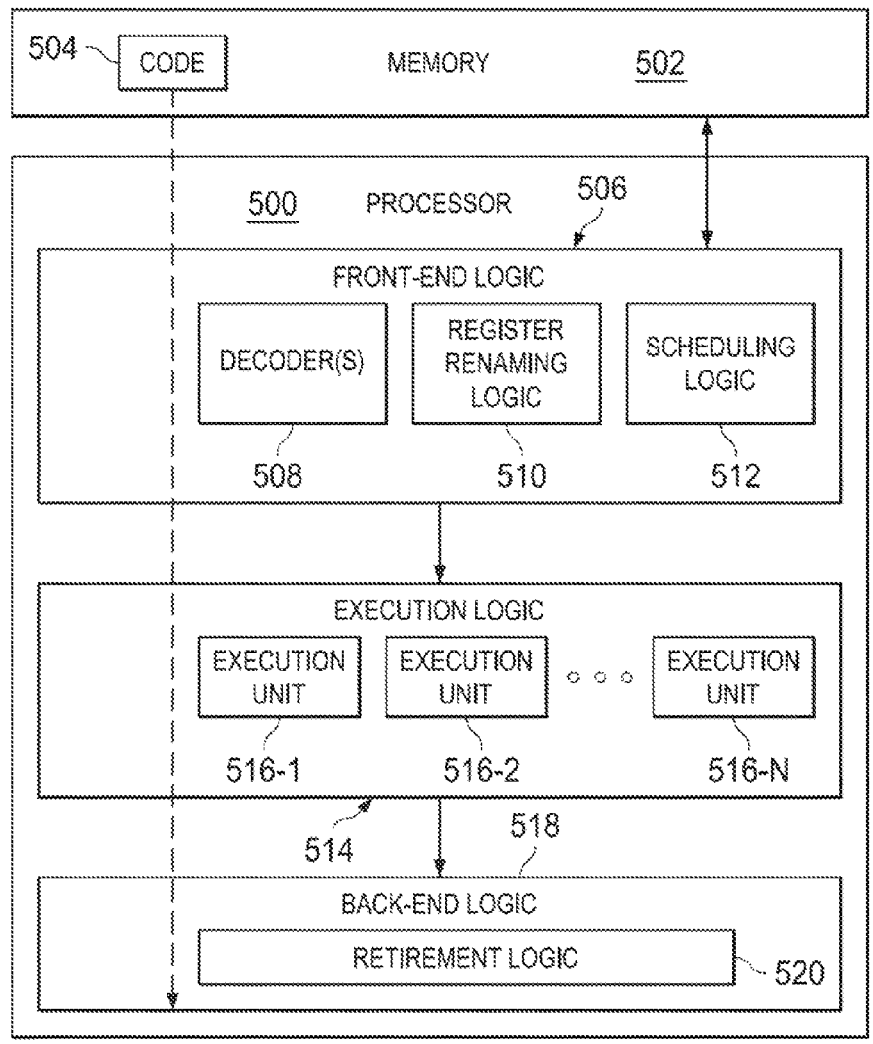
FIG. 5 also illustrates a memory coupled to processor in accordance with an embodiment.

FIG. 5 illustrates a memory 502 coupled to processor 500 in accordance with an embodiment. Memory 502 may be any one of a wide variety of memories (including various layers of memory hierarchy) as are known or otherwise available to those of skill in the art. The memory 502 may include code 504, which may be one or more instructions, to be executed by processor 500. Processor 500 follows a program sequence of instructions indicated by code 504. Each instruction enters a front-end logic 506 and is processed by one or more decoders 508. The decoder may generate as its output a micro operation such as a fixed width micro operation in a predefined format, or may generate other instructions, microinstructions, or control signals that reflect the original code instruction. Front-end logic 506 also includes register renaming logic 510 and scheduling logic 512, which can generally allocate resources and queue the operation corresponding to the convert instruction for execution.

Processor 500 is shown including execution logic 514 having a set of execution units 516-1 through 516-N. Some embodiments may include a number of execution units dedicated to specific functions or sets of functions. Other embodiments may include only one execution unit or one execution unit that can perform a particular function. Execution logic 514 performs the operations specified by code instructions.

After completion of execution of the operations specified by the code instructions, back-end logic 518 retires the instructions of code 504. In one embodiment, processor 500 allows out of order execution but requires in order retirement of instructions. Retirement logic 520 may take a variety of forms as known to those of skill in the art (e.g., re-order buffers or the like). In this manner, processor 500 is transformed during execution of code 504, at least in terms of the output generated by the decoder, hardware registers and tables utilized by register renaming logic 510, and any registers (not shown) modified by execution logic 514.

Although not illustrated in FIG. 5, a processing element may include other elements on a chip with processor 500. For example, a processing element may include memory control logic along with processor 500. The processing element may include I/O control logic and/or may include I/O control logic integrated with memory control logic. The processing element may also include one or more caches.

FIG. 6 illustrates a computing system 600 that is arranged in a point-to-point (PtP) configuration according to an embodiment. In particular, FIG. 6 shows a system where processors, memory, and input/output devices are interconnected by a number of point-to-point interfaces.

As illustrated in FIG. 6, system 600 may include several processors, of which only two, processors 602 and 604, are shown for clarity. Processors 602 and 604 may each include a set of cores 603 and 605 to execute multiple threads of a program. Processors 602 and 604 may also each include integrated memory controller logic (MC) 606 and 608 to communicate with memories 610 and 612. The memories 610 and/or 612 may store various data such as those discussed with reference to memory 612. In alternative embodiments, memory controller logic 606 and 608 may be discrete logic separate from processors 602 and 604.

Processors 602 and 604 may be any type of a processor such as those discussed with reference to processor 214 of FIG. 2. Processors 602 and 604 may exchange data via a point-to-point (PtP) interface 614 using point-to-point interface circuits 616 and 618, respectively. Processors 602 and 604 may each exchange data with a chipset 620 via individual point-to-point interfaces 622 and 624 using point-to-point interface circuits 626, 628, 630, and 632. Chipset 620 may also exchange data with a high-performance graphics circuit 634 via a high-performance graphics interface 636, using an interface circuit 637, which could be a PtP interface circuit. In alternative embodiments, any or all of the PtP links illustrated in FIG. 6 could be implemented as a multi-drop bus rather than a PtP link.

At least one embodiment, as disclosed herein, may be provided within the processors 602 and 604. Other embodiments, however, may exist in other circuits, logic units, or devices within the system 600 of FIG. 6. Furthermore, other embodiments may be distributed throughout several circuits, logic units, or devices illustrated in FIG. 6.

Chipset 620 may be in communication with a bus 640 via an interface circuit 641. Bus 640 may have one or more devices that communicate over it, such as a bus bridge 642 and I/O devices 643. Via a bus 644, bus bridge 643 may be in communication with other devices such as a keyboard/mouse 645 (or other input device such as a touch screen, for example), communication devices 646 (such as modems, network interface devices, or other types of communication devices that may communicate through a computer network), audio I/O device 647, and/or a data storage device 648. Data storage device 648 may store code 649 that may be executed by processors 602 and/or 604. In alternative embodiments, any portions of the bus architectures could be implemented with one or more PtP links.

The computer systems depicted in FIGS. 5 and 6 are schematic illustrations of embodiments of computing systems that may be utilized to implement various embodiments discussed herein. It will be appreciated that various components of the systems depicted in FIGS. 5 and 6 may be combined in a system-on-a-chip (SoC) architecture or in any other suitable configuration. For example, embodiments disclosed herein can be incorporated into systems such as, for example, mobile devices such as smart cellular telephones, tablet computers, personal digital assistants, portable gaming devices, etc. It will be appreciated that these mobile devices may be provided with SoC architectures in at least some embodiments. Further, while the examples of the above discussion have focused on the use of close proximity communications to facilitate premises-aware enforcement of various policies on mobile computing device, it should be appreciated that similar principles can be applied to other computing devices such as desktop computers, printers, monitors, servers, and other peripherals and devices equipped with close proximity communication functionality that are not necessarily adapted for mobility.

Note that in certain example implementations, the security module functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., FPGA, EPROM, EEPROM) or an ASIC that includes digital logic, software, code, electronic instructions, or any suitable combination thereof.

In one example implementation, the security module may include software in order to achieve the location management activities outlined herein. The security module can include memory elements for storing information to be used in achieving the location management activities, as discussed herein. Additionally, security module may include a processor that can execute software or an algorithm to perform the location management activities, as disclosed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein (e.g., databases, tables, trees, caches, etc.) should be construed as being encompassed within the broad term 'memory element.' Similarly, any of the potential processing elements, modules, and machines described in this Specification should be construed as being encompassed within the broad term 'processor.'

Note that with the example provided above, as well as numerous other examples provided herein, interaction might be described in terms of two, three, or four elements. However, this has been done for purposes of clarity and example only. In certain cases, it may be easier to describe one or more of the functionalities of a given set of flows by only referencing a limited number of elements. It should be appreciated that the security module (and its teachings) are readily scalable and can accommodate a large number of components, as well as more complicated/sophisticated arrangements and configurations. Accordingly, the examples provided should not limit the scope or inhibit the broad teachings of the security systems as potentially applied to a myriad of other architectures.

It is also important to note that the operations in the preceding flow diagrams illustrate only some of the possible scenarios and patterns that may be executed by, or within, a security system. Some of these operations may be deleted or removed where appropriate, or may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. A security module provides substantial flexibility in that any suitable arrangements, chronologies, configurations, and timing mechanisms may be provided without departing from the teachings of the present disclosure.

The following examples pertain to embodiments in accordance with this Specification. One or more embodiments may provide an apparatus, a system, a machine readable medium, and a method to receive, over a close proximity wireless communication, a location identifier corresponding to a computing device at a premises. A policy database can be accessed to identify at least one policy based at least in part on the location identifier. The at least one policy can be applied to a computing device while the computing device is within the premises.

In one example, the location identifier is received from a wireless non-contact writer.

In one example, the location identifier is received at a wireless non-contact device on the computing device.

In one example, the wireless non-contact device includes a non-volatile memory with an antenna.

In one example, it can be determined, based at least in part on the received location information, that the computing device enters a premises corresponding to the location information.

In one example, the location information is received at a first instance and receiving the location information at a subsequent, second instance causes a determination that the computing device exits the premises.

In one example, a location identifier is to be stored in memory based on receiving the location information at the first instance and the location identifier is to be removed from the memory based on receiving the location information at the second instance.

In one example, the at least one policy corresponds to the premises and determining that the computing device exits the premises causes the application of the at least one policy to be discontinued.

In one example, steps can be performed using the computing device.

In one example, the close proximity wireless communication includes at least one of near field communication (NFC), radio frequency identification (RFID), and Bluetooth communications.

In one example, it can be determined, based at least in part on the received location information, that the computing device enters a premises corresponding to the location information.

In one example, the at least one policy is further based on a user profile associated with the computing device.

One or more embodiments may provide an apparatus, a system, a machine readable medium, and a method to detect a computing device using close proximity wireless communication and send location information to the computing device using close proximity wireless communication, the location information corresponding to a particular premises. Policies applied to the computing device while the computing device is present within the particular premises can be based at least in part on the computing device possessing the location information.

In one example, the location information indicates that the computing device has entered the particular premises and the policies are activated based on the sending of the location information.

In one example, the location information indicates that the computing device has exited the particular premises and the policies are discontinued based on the sending of the location information.

In one example, the close proximity wireless communication comprises at least one of near field communication (NFC), radio frequency identification (RFID), and Bluetooth communications.

In one example, policies to apply to the computing device can be determined and an identification of the policies can be caused to be sent to the computing device over a network.

In one example, a query can be received from the computing device and the policies can be sent in response to the query.

In one example, one or more attributes of the computing device can be determined based at least in part on the one or more attributes.

In one example, detecting the computing device includes receiving a device identifier of the computing device over a close proximity wireless communication.

In one example, user information of a particular user is identified and the device identifier can be associated with the particular user.

In one example, the user information is to be received from a scan of a physical user identifier.

In one example, the at least one policy is based at least in part on the user information.

One or more embodiments may provide an apparatus, a system, a machine readable medium, and a method to transmit a location identifier to a computing device over a close proximity wireless communication channel, the location identifier corresponding to a particular premises. A particular one of the set of policies can be applied to the computing device while the computing device is within the particular premises based at least in part on possession of the location identifier by the computing device.

In one example, a system can include at least one processor device, at least one memory element, a policy server with a set of policies associated with a set of locations, and a wireless non-contact writer.

Some or all of the features may be computer-implemented methods or further included in respective systems or other devices for performing this described functionality. The details of these and other features, aspects, and implementations of the present disclosure are set forth in the accompanying drawings and the above description. Other features, objects, and advantages of the disclosure should be apparent from the description and drawings, and from the claims.

What is claimed is:

1. At least one non-transitory machine accessible storage medium having instructions stored thereon, the instructions when executed on a machine, cause the machine to:
    receive, at a computing device, a near field wireless signal indicating a location identifier for to the computing device, wherein the near field wireless signal is received as the computing device enters a gate of the particular portion of the premises and the location identifier identifies that the computing device has entered a gate of a particular portion of a premises, and the particular portion comprises a particular one of a plurality of floors of a building;
    send a request, over a network, to a policy server system, for policy information corresponding to the particular portion of the premises, wherein the request identifies the location identifier and describes attributes of the computing device;
    receive the policy information from the policy server, wherein the policy information identifies at least one policy corresponding to the particular portion of the premises and is to be use by a security software agent installed on the computing device to apply the at least one policy to the computing device; and
    cause the at least one policy to be applied to the computing device while the computing device is on the particular portion of the premises, wherein a different policy is to be applied in another portion of the premises comprising a different one of the plurality of floors.

2. The at least one storage medium of claim 1, wherein the signal is received from a wireless non-contact writer.

3. The at least one storage medium of claim 1, wherein the signal is received at a wireless non-contact device on the computing device.

4. The at least one storage medium of claim 3, wherein the wireless non-contact device includes a non-volatile memory with an antenna and the location identifier is written to the non-volatile memory.

5. The at least one storage medium of claim 1, wherein the instructions when executed, further cause the machine to determine, based at least in part on the received location identifier, that the computing device enters the particular portion of the premises corresponding to the location identifier.

6. The at least one storage medium of claim 5, wherein the instructions when executed, further cause the machine to receive another near field wireless signal to erase the location identifier from the computing device, wherein the other near field wireless signal corresponds to the computing device exiting a gate of the particular portion of the premises.

7. The at least one storage medium of claim 6, wherein the at least one policy corresponds to the particular portion of the premises and determining that the computing device exits the particular portion of the premises causes application of the at least one policy at the computing device to be discontinued.

8. A method comprising:
    receiving, using near field wireless communication, a location identifier corresponding to a computing device at a particular portion of a premises, wherein the location identifier is received as the computing device enters a gate of the particular portion of the premises and identifies that the computing device has entered the particular portion of the premises, wherein the particular portion comprises a particular one of a plurality of floors of a building;
    sending a request, over a network, from the computing device to a policy server system, for policy information corresponding to the premises, wherein the request identifies the location identifier and includes information describing attributes of the computing device;
    receiving the policy information from the policy server, wherein the policy information identifies at least one policy corresponding to the particular portion of the premises and the policy information is received at the computing device to be used by a security software agent installed on the computing device to apply the at least one policy to the computing device, wherein a different policy is to be applied in another portion of the premises comprising a different one of the plurality of floors; and
    causing the at least one policy to be applied to the computing device while the computing device is within the particular portion of the premises.

9. The method of claim 8, wherein the near field wireless communication comprises at least one of near field communication (NFC), radio frequency identification (RFID), and Bluetooth communications.

10. The method of claim 8, wherein the at least one policy is further based on a user profile associated with the computing device.

11. The method of claim 8, wherein the attributes include global positioning system (GPS) location information for the computing device generated by a GPS sensor local to the computing device to corroborate location of the computing device.

12. The method of claim 8, wherein the attributes include a device identifier associated with a registration of the device corresponding to the policy server.

13. A system comprising:
a computing device comprising:
   a wireless non-contact reader to receive a location identifier at a gate of a particular portion of a premises, wherein the location identifier identifies that the computing device has entered the particular portion of the premises, and the particular portion comprises a particular one of a plurality of floors of a building; and
   a policy agent to:
      send a request, to a policy server, for policy information corresponding to the premises, wherein the request identifies the location identifier and includes information describing attributes of the computing device;
      receive the policy information from the policy server, wherein the policy information identifies at least one policy corresponding to the particular portion of the premises; and
      use the policy information to apply the at least one policy to the computing device while the computing device is within the particular portion of the premises, wherein a different policy is to be applied in another portion of the premises comprising a different one of the plurality of floors.

14. The system of claim 13,
wherein the policy agent uses the policy information to apply the at least one policy to the computing device by configuring applications on the computing device based at least in part on the particular policy.

15. The system of claim 13, further comprising the policy server, wherein the policy server hosts a set of policies associated with a set of locations, and the set of policies comprises the at least one policy.

16. The system of claim 13, further comprising a wireless non-contact writer configured to transmit the location identifier to the computing device over a near field wireless communication channel, wherein the wireless non-contact reader receives the location identifier from the wireless non-contact writer.

17. The system of claim 16, wherein the wireless non-contact writer is located at the gate.

18. The system of claim 13, wherein the computing device comprises a mobile computing device.

* * * * *